Patented June 25, 1929.

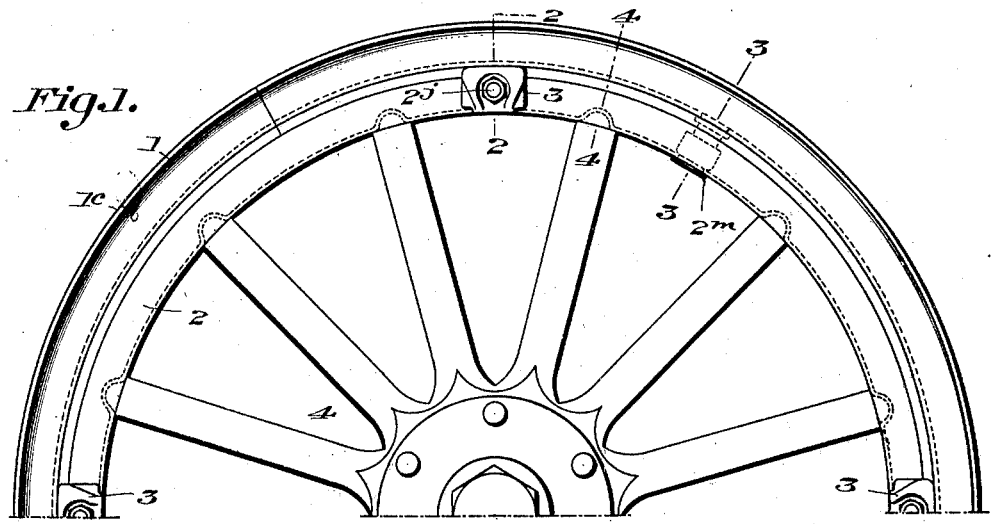

1,718,612

UNITED STATES PATENT OFFICE.

JOSEPH G. SWAIN, OF AKRON, OHIO, ASSIGNOR TO THE FIRESTONE STEEL PRODUCTS COMPANY, OF AKRON, OHIO, A CORPORATION OF OHIO.

WHEEL STRUCTURE.

Application filed April 20, 1922. Serial No. 555,722.

My invention relates to improvements in wheels of the type that includes a demountable tire carrying rim.

The invention is directed broadly toward providing an improved structure over that disclosed in my copending application, Serial Number 502,328 filed September 22, 1921, Patent No. 1,649,772, November 15, 1927.

Specifically it comprehends an improved form of split rim for use with "straight side" tires, a felloe particularly adapted to support the rim, and a fastening structure especially designed for cooperation with this specific character of rim and felloe to secure them in assembled relation.

Other objects and advantages, such as the provision of a light easily assembled equipment, which possesses the requisite rigidity and lightness of structure, will hereinafter appear and the nature of the invention will be more fully understood when the following description is read in conjunction with the drawings accompanying and forming a part of this specification.

In the drawings:

Figure 1 is a fragmentary side elevational view of wheel embodying my invention.

Figure 2 is a transverse sectional view, on an enlarged scale, taken on the line 2—2 of Figure 1.

Figure 3 is a similar view, taken on the line 3—3 of Figure 1.

Figure 4 is also a transverse sectional view, taken on the line 4—4 of Figure 1.

Figure 5 is a fragmentary plan view, on an enlarged scale, illustrating a detail of the rim construction; and Figure 6 is a fragmentary, side elevational view, also on an enlarged scale, illustrating a detail of construction of the felloe.

Referring to the drawings by numerals, 1 designates the rim, 2 the felloe, 3 the fastening devices or clamps, and 4 the spokes of the wheel, embodying the essential features of my invention which will now be described in detail.

The rim 1 embodies a tire supporting annulus $1^a$, and vertically disposed tire retaining edge flanges $1^b$ and $1^c$ respectively, which are formed integrally with the rim and constructed for cooperation with the bead portion of a "straight side" tire. The annulus $1^a$ is slightly concave in transverse section as is usual in rims of this variety, and at its juncture with the flanges $1^b$ and $1^c$ is shaped to provide rounded edge portions $1^d$ respectively upon the annulus. Adjacent one of its edges $1^d$, the annulus is provided with a circumferential bead $1^e$, upon its inner peripheral face. The bead $1^e$ is offset from the adjacent rounded edge portion $1^d$ in such manner that an annular shoulder $1^g$ is provided by said portion. The inner face of the bead $1^e$, in transverse section, presents a transversely straight annular seating surface $1^h$ that, in cross-section, is inclined toward its juncture with the side face $1^f$ thereof and toward the axis of the wheel.

The rim 1 is split transversely, as at $1^i$ and suitable locking means $1^j$ are utilized for securing the ends thereof in abutting relation as shown in dotted lines in Figure 5. The locking means, per se, forms no part of the present invention and therefore needs no further description herein. Preferably the type of valve stem inlet, shown in Figure 3, is utilized in the present instance. This device comprises a radially disposed cuff $1^k$ reamed into an opening $1^l$ in the rim. It is fully described in my aforesaid copending application.

The felloe 2, comprises a transversely flat annulus $2^a$ designed to be supported upon the spokes 4 in any suitable manner. Preferably the annulus is provided with radially disposed rounded sockets which receive correspondingly shaped knobs $4^a$ at the ends of the spokes as shown in Figure 4. This feature likewise forms, per se, no part of the invention and is merely illustrative of one manner of accomplishing a fixed relation between the spokes and the felloe. The annulus $2^a$ is provided with vertically disposed edge flanges designated respectively $2^b$ and $2^c$ which are adapted to support the aforesaid rim thru engagement with one rounded edge $1^d$ thereof and the annular seating surface $1^h$ previously described. To this end the flange $2^b$ is provided with a peripheral surface that is inclined in coincidence with said surface $1^h$ of the rim, to form an annular seat $2^d$ therefor. Preferably the portion of the flange $2^b$ adjacent the seat $2^d$ is increased in thickness in the direction of the outer side of the flange to form a bead portion $2^o$ as shown in Figures 2, 3, and 4. The flange $2^c$ is provided with a laterally offset portion $2^e$ that overhangs said flange and forms an annular seat for its adjacent edge of the rim 1. In transverse section the portion $2^e$ is shaped to present an obliquely disposed slightly concave portion $2^g$ adapted to receive the inner peripheral edge of the rim. At its extreme edge the obliquely disposed concave surface $2^g$ terminates in a lip portion $2^h$ of relatively shorter curvature that forms a seat conforming in contour to the rounded edge $1^d$ of the rim.

Flanges $2^b$ and $2^c$ are provided with transversely aligned apertures $2^i$ which are designed to receive threaded bolts $2^j$, that are preferably shouldered as at $2^k$ adjacent their threaded end $2^l$ to serve as an abutment or spacer which prevents the collapse of the felloe upon tightening of the clamp. A valve receiving cuff $2^m$ is provided in the felloe for radial alignment with the aforesaid cuff $1^k$ in the rim. The cuff $2^m$ is designed to cooperate with the aforesaid cuff $1^k$, as shown in Figure 3, to prevent relative circumferential movement of the rim and felloe.

A clamp of the character shown in Figure 2, is utilized in conjunction with the aforesaid bolts $2^j$ to secure the rim and felloe in assembled relation. Each clamp 3 is provided with an aperture $3^a$ to receive one of the bolts $2^j$. In cross-section, one end of the clamp is formed with a concave obliquely disposed seat $3^b$ designed to seat against the convex side face $1^f$ of the bead $1^e$. The portion $3^b$ adjoins a relatively sharp nose portion $3^c$ designed to seat at the juncture of said face $1^f$ and the adjacent rounded edge of the rim. The opposite end of each clamp 3 is provided with a laterally extending lug $3^d$ adapted to abut the flange $2^b$, and a relatively longer laterally projecting lug $3^e$ upon each side of the lug $3^d$ designed to be received in apertures $2^n$. The apertures $2^n$ are disposed in the flange $2^b$ of the felloe in the manner shown in Figure 6 of the drawings. This application is a continuation in part of my co-pending application Serial No. 550,005 filed April 6, 1922 as to this type of rim mounting and clamp.

The foregoing has been found to constitute an easily assembled equipment whereby a split demountable rim may be securely affixed to a metal felloe and readily removed therefrom. The structure is easy to manufacture and is durable, while at the same time it combines lightness with the maximum rigidity requisite in wheels of this type.

Although in describing the details of my invention, I have necessarily utilized certain specific terms, it is to be understood that the disclosure is illustrative in nature, and is not to be construed as in any way limiting the scope or spirit of the invention unless such limitations are particularly expressed in the claims appended hereto.

I claim:

1. A wedge lug having a short fulcrum projection at its bottom, a perforation for a bolt at its center, and supporting lugs on opposite sides of the perforation which project in a direction substantially tangent to the arc in which the lug swings about the fulcrum projection.

2. A wedge lug having a short fulcrum projecting at its bottom, a rim-engaging backwardly and upwardly sloping wedge surface at its top, and intermediate inwardly projecting supporting lugs.

3. In combination, a channel felloe comprising a base and radially extending side flanges, one of said flanges being provided with apertures therethrough, a demountable rim on said felloe, clamp members engaging said rim, each clamp member fulcrumed adjacent said base and provided with lugs extending laterally from its intermediate portion for engaging the apertures in said flange for supporting one edge of said rim, and means for clamping said clamp members against said rim.

JOSEPH G. SWAIN.